(12) United States Patent
Menon et al.

(10) Patent No.: US 9,507,162 B1
(45) Date of Patent: Nov. 29, 2016

(54) DISPLAY COMPONENT ASSEMBLY

(71) Applicant: Amazon Technologies, Inc., Seattle, WA (US)

(72) Inventors: Anoop Menon, Capitola, CA (US); Chin Siong Khor, San Jose, CA (US); Robert Arthur Sprague, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/491,382

(22) Filed: Sep. 19, 2014

(51) Int. Cl.
| G02F 1/1335 | (2006.01) |
| G02B 27/22 | (2006.01) |
| G02F 1/1333 | (2006.01) |
| B32B 37/18 | (2006.01) |
| B32B 37/02 | (2006.01) |
| B32B 37/12 | (2006.01) |
| B32B 38/00 | (2006.01) |

(52) U.S. Cl.
CPC .......... *G02B 27/2214* (2013.01); *B32B 37/02* (2013.01); *B32B 37/12* (2013.01); *B32B 37/18* (2013.01); *B32B 38/0012* (2013.01); *G02F 1/13338* (2013.01); *B32B 2307/412* (2013.01); *B32B 2310/0831* (2013.01); *B32B 2457/202* (2013.01)

(58) Field of Classification Search
CPC .......... G02B 27/2214; G02F 1/13338; B32B 38/0012; B32B 37/02; B32B 37/18; B32B 37/12; B32B 2310/0831; B32B 2307/412; B32B 2457/202
See application file for complete search history.

(56) References Cited

U.S. PATENT DOCUMENTS

| 6,322,236 | B1 | 11/2001 | Campbell et al. | |
| 8,599,321 | B2 * | 12/2013 | Kao | G06F 3/045 345/173 |
| 2003/0161040 | A1 * | 8/2003 | Ishii et al. | G02B 27/2214 359/463 |
| 2008/0014378 | A1 * | 1/2008 | Hoffmuller et al. | B42D 25/29 428/29 |
| 2009/0008923 | A1 * | 1/2009 | Kaule et al. | B42D 25/00 283/67 |
| 2009/0056858 | A1 * | 3/2009 | Davila Casitas et al. | B41F 16/00 156/184 |
| 2010/0053749 | A1 * | 3/2010 | Yun et al. | G02F 1/133502 359/464 |
| 2010/0328438 | A1 * | 12/2010 | Ohyama et al. | G02B 27/2214 348/51 |
| 2011/0241989 | A1 * | 10/2011 | Park et al. | G06F 3/0412 345/158 |
| 2012/0229718 | A1 | 9/2012 | Huang et al. | |
| 2013/0070480 | A1 * | 3/2013 | Griffin et al. | G02B 6/0028 362/612 |
| 2013/0217161 | A1 * | 8/2013 | Hsu | H01L 25/0753 438/29 |
| 2014/0022634 | A1 * | 1/2014 | Takahashi | G02B 27/2214 359/463 |
| 2014/0092342 | A1 * | 4/2014 | Franklin et al. | G02B 6/0088 349/62 |
| 2014/0125602 | A1 * | 5/2014 | Chen | G06F 3/041 345/173 |
| 2014/0240617 | A1 * | 8/2014 | Fukutome et al. | G02F 1/13338 349/12 |
| 2014/0254021 | A1 * | 9/2014 | Furui | B32B 7/02 359/609 |
| 2014/0340591 | A1 * | 11/2014 | Chang | G06F 3/041 349/12 |
| 2014/0340745 | A1 * | 11/2014 | Gibilisco | G02B 27/2214 359/463 |
| 2015/0145804 | A1 * | 5/2015 | Ma | G06F 3/044 345/174 |

\* cited by examiner

*Primary Examiner* — Donald Raleigh
(74) *Attorney, Agent, or Firm* — Lee & Hayes, PLLC

(57) ABSTRACT

Describe herein are electronic devices that includes a display stack having a display component configured to display a three dimensional image. In some instances, the display component includes a layer of lenticular structures or lenses formed by applying a layer of liquid lacquer to a surface associated with the display component, embossing the lenticular structures into the lacquer, and curing or hardening the lenticular structures in place.

23 Claims, 9 Drawing Sheets

DISPLAY COMPONENT ASSEMBLY

BACKGROUND

A large and growing population of users is enjoying entertainment through the consumption of digital content, such as music, movies, images, electronic books, and so on. The users employ various devices with various different kinds of electronic displays such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth to view the digital content. Electronic displays may present various types of information, such as user interfaces, device operational status, digital content items, and the like, depending on the kind and purpose of the associated device. The appearance, quality, and type of a display can affect the user's experience with the electronic device and the content presented thereon. Accordingly, finding ways to enhance user experience and satisfaction continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
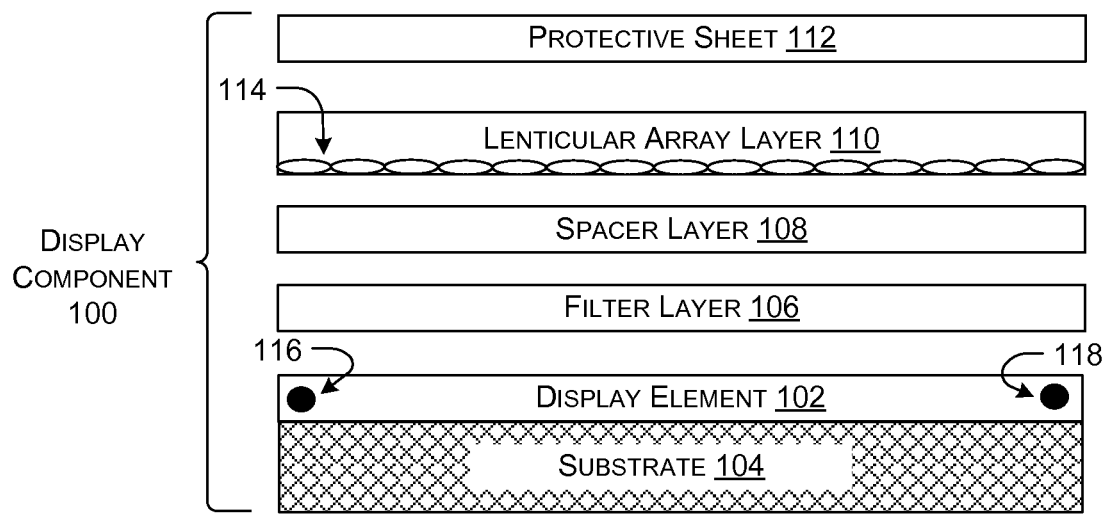
FIG. 1 illustrates an example schematic cross-section of a display component of a display stack associated with an electronic device.

This disclosure describes, in part, electronic devices that include electronic displays and three dimensional (3D) electronic displays for displaying digital content to one or more users. In some particular examples, this disclosure describes ways to provide a thinner, lighter, more stable, and/or cheaper electronic device with improved optical quality. For instance, in some implementations, a 3D display component may be manufactured using a wet coating and microembossing to provide improved alignment between the lenticular array responsible in part for generating the 3D effect and the pixels of the display element responsible in part for generating the image. For example, in some 3D displays, the lenticular array may be formed as part of a plastic film that is laminated atop the display element. However, when a lamination process is utilized, the lenticular structures of the lenticular array are susceptible to misalignment with regards to the pixels of the display element, thereby causing signal loss or reduce optical quality of the resulting display component, the overall display stack and/or the electronic device.

For instance, when the plastic film incorporating the lenticular structures or lenses (e.g., structures or lens that are elliptical, bi-convex, aspherically curved, circular, or triangular for displaying 3D images) undergoes the lamentation process, the film is typically heated or cured, which may cause the plastic film to warp, shrink, or expand at various locations. Even though the warping may be minimal in most situations, the alignment between the lenticular structures and the pixels of the display element has very low tolerances, for instance, within five microns. Therefore, in some of the implementations described herein, the display component is formed by applying a wet coating of lacquer over the display element, optically aligning the display component with an embossing plate, and embossing a configured lenticular array (via plates or rollers) into the wet coating or layer of lacquer to generate a display stack having improved optical quality. For example, the display component may be configured with one or more markings which may be detected by a camera or other optical device attached to the embossing plate in order to more accurate align the embossing plate and the display component before stamping or rolling the lenticular array out of the layer of lacquer. In one particular example, the optical device may be configured to identify each pixel of the display component (or a center of each pixel) and to align the embossing plate with the display component based in part on the location of the pixels relative to the edge of the display.

In some cases, the wet layer of lacquer may be substituted for a layer of resign, thermal plastic material, epoxy, solvent curable material, and/or chemical embossing material. Depending on the material selected, additional processing or treatment of materials may be performed before embossing the lenticular array. For example, the material selected may be heated or treated with a chemical or solvent to aid the embossing plate in forming the lenticular array. In some specific implementations, rather than stamping the lenticular array, a machine may trace, based at least in part on the optical alignment or on a three dimensional scan of the pixels or markings on the display stack, the lenticular array by applying a chemical or solvent in a pattern associated with lenticular array, for instance, when a solvent curable material is selected.

In addition to the display component, a display stack has a number of other components, including a number of substrates and one or more adhesive layers to bond the substrates. For example, a number of additional substrates may be stacked on top of the display component. To illustrate, a display stack may include a touch sensing layer that generates signals in response to an input device contacting the display stack. In some cases, a substrate of the display stack may include a coverglass layer located at the top of the display stack to protect other substrates of the display stack. The display stack may also include a lighting component, such as a front-side lighting component or a backlight lighting component to provide light to view the content displayed by the display component.

Figure 4:
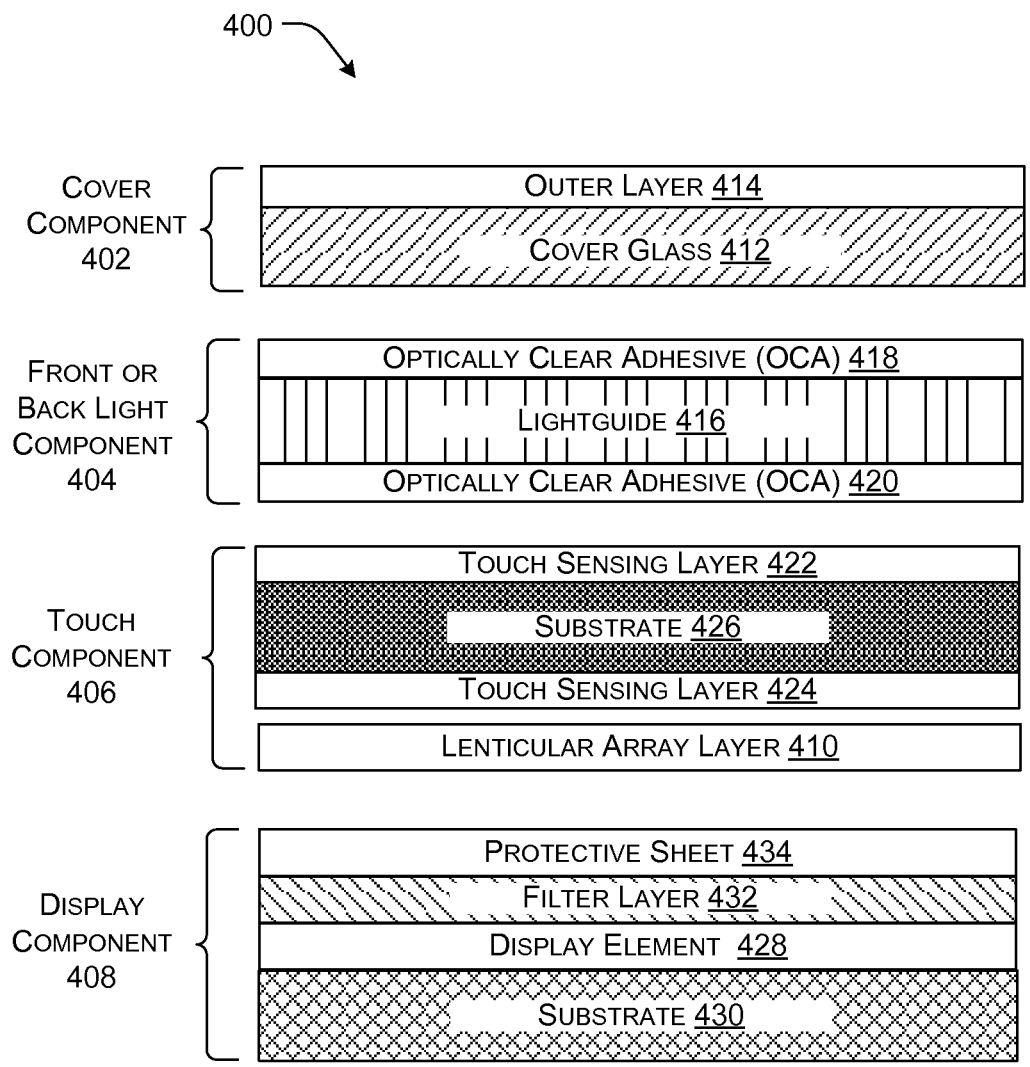
FIG. 4 illustrates an example schematic cross-section of a display stack of an electronic device.
Figure 5:
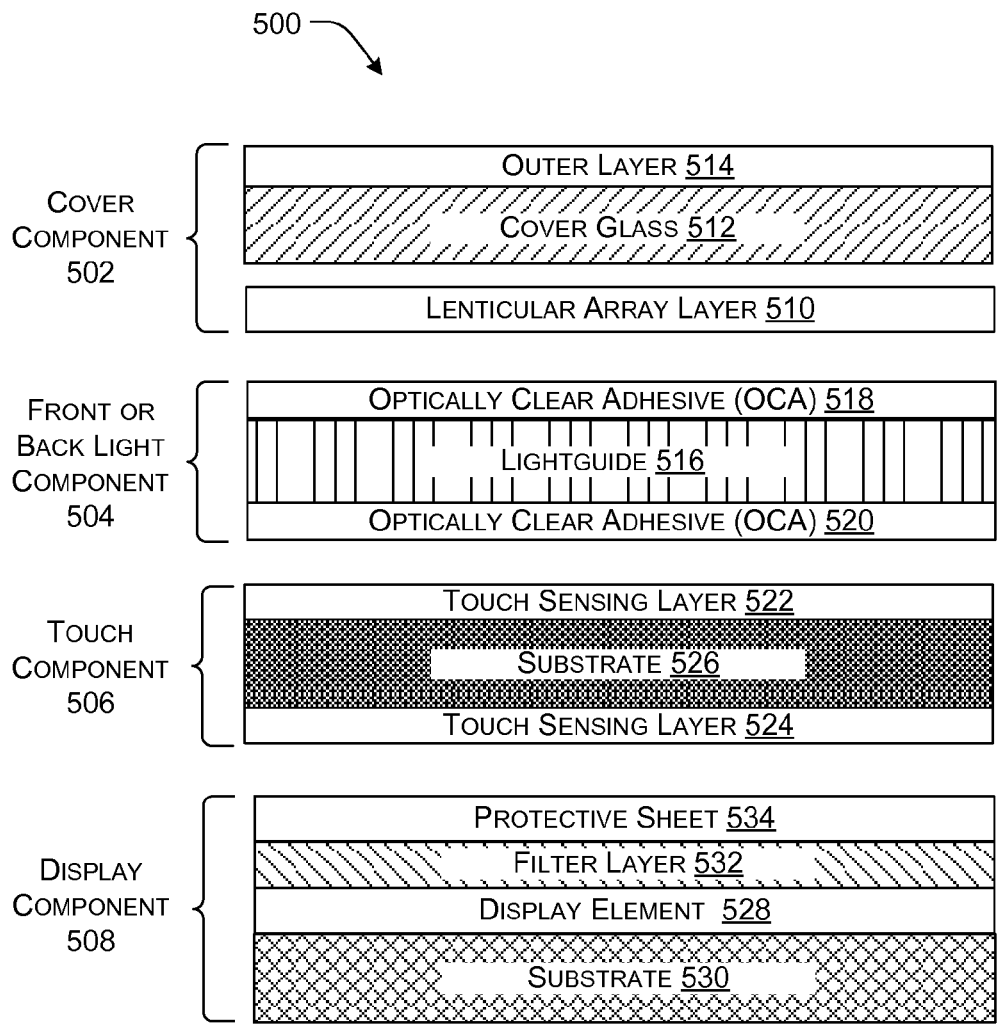
FIG. 5 illustrates an example schematic cross-section of a display stack of an electronic device.

In an illustrative implementation, the display stack may be formed by combining a number of substrates and/or components one atop the other. For instance, FIGS. 1-3, described below, illustrate example schematic cross-section of a display component and FIGS. 4 and 5 illustrate example schematic cross-section of a display stack taken along line A-A of FIG. 6.

FIG. 1 illustrates an example schematic cross-section of a display component 100 of a display stack associated with an electronic device. The display component 100 may include a display element 102 atop a structure substrate 104 that provides support and rigidity for the display component 100. In general, the display element 102 may include various types of image-displaying technology or components. For example, the display element may include reflective liquid crystal display (LCD) elements, bi-stable LCD elements, micro electromechanical system (MEMS) display elements, interferometric modulator display elements, cholesteric display elements, electrophoretic display elements, reflective display elements, electrofluidic pixel display elements, electrowetting display elements, photonic ink or electronic paper display elements, gyricon display elements, and the like. In other implementations, image-displaying technology or components may include active matrix displays or display technology, such as thin-film-transistor (TFT) LCD display elements, plasma display elements, light emitting diode (LED) display elements, organic light emitting diode (OLED) display elements, and so forth. Accordingly, implementations of the display stack, display component, and/or display element described herein are not limited to any particular display technology.

In the illustrated example, a filter layer or filter glass 106 is located atop the display element 102. The filter glass may include one or more of layers having antiglare properties, antireflective properties, and/or ultra-violate (UV) properties to provide additional protection to the display element 102. For example, the filter layer 106 may include a silicone material or a silicone optically clear adhesive (OCA) having desired refractive index or an acrylic material or an acrylic OCA having specific UV reflecting properties. In other examples, the filter layer may include a material tuned to ensure that a resulting color of the display stack viewed by a user is correct or be manufactured with additives such as a UV-absorbing agent.

The display component 100 may also include a spacer layer 108 and a lenticular array layer 110 positioned atop the filter layer 106. In general, the lenticular array includes an array of magnifying lenses aligned with the pixels of the display element 102. For example, each of the lenticular structures or magnifying lenses of the lenticular array may be aligned with a pixel such that a lateral offset between a center of each lenticular structure and a center of the corresponding pixel is less than 5 microns. The magnifying lenses may be designed to alter a viewing angle associated with each of the pixels, such that the user views different images or the image at different depths with each eye and thereby the display component 100 is capable of producing a 3D image. In some cases, the lenticular array may be arranged with regards to the pixels of the display element 102, such that a 3D image may be produced by the display component 100 without the use of specialized viewing glasses or spectacles.

The space layer 108 may be positioned between the display element 102 and the lenticular array layer 110 to improve the overall viewing comfort of a user when viewing a 3D image by configuring a distance or separation of the display element 102 and the lenticular array layer 110. In some instance, the distance or separation may be based on a distance between an average user's eyes, for example, a distance between 50 microns and 100 micro may be desired to achieve improved 3D images. In other examples, a distance between the lenticular array layer 110 and the display element 102 may be 75 microns based on an average distance of 75 cm between user's eyes. In some instances, the spacer layer 108 may be formed as an air gap, a second lenticular layer, or from any optical transparent material, such as an optically clear adhesive (OCA).

In some instances, the lenticular array layer 110 may be formed by applying a wet coating of lacquer on top of the spacer layer 108. The lenticular or lenses or structures 114 that form the lenticular array may be embossed to the layer of lacquer using a mold, die, or roller having a pre-aligned pattern imprinted thereon. In some cases, the lacquer or embossed lenses may be UV cured or heat cured under pressure while the mold, die, or roller is in place to more accurately (e.g., within five microns) align the lenticular lens or structures 114 associated with the lenticular array with the pixels of the display element 102.

In another instance, the lenticular array layer 110 may be formed by applying a wet coating of lacquer on top of the spacer layer 108. The lenticular or lenses or structures 114 that form the lenticular array may be embossed or stamped into the layer of lacquer using a mold, die, or roller having a pre-aligned pattern imprinted thereon. In some cases, the mold, die, or roller may be attracted to a camera or other optical device and the display stack may include one or more markings, such as markings 116 and 118, that the camera or other optical device may detect and utilize to more accurately align the display stack with the mold, die, or roller before the lenticular structures 114 are stamped out of the layer of lacquer.

In additional instances, rather than applying a wet layer of lacquer, a layer of resign, thermal plastic material, epoxy, solvent curable material, chemical embossing material, among others may be applied to the top of the spacer layer 108. Depending on the material selected, rather than stamping or embossing using a mold, die, or plate as described above, a treatment or chemical may be traced in a pattern to form the lenticular lenses 114 out of, for example, the solvent curable material. In other instances, the lenticular array layer 110 may be formed or built in place by thermal embossing, electrowetting, film lithography, 3D printing, among other technics.

In the illustrated example, a protective sheet 112 is positioned atop the lenticular array layer 110. The protective sheet 112 may be formed from an inorganic material (e.g., a plastic or polymer) or an inorganic material (e.g., glass). For example, the protective sheet 112 may be formed from a plastic material to further reduce the weight of the overall display component 100. In other cases, the protective sheet 112 may be formed from glass to further reduce the overall size of the substrate 104 and/or to provide additional strength and rigidity during assembly of the display stack to further improve yields. In some cases, the protective sheet 534 may be configured to have antiglare proprieties, anti-reflective properties, a particular refractive index, a particular luminous transmittance rating, or include other type of coatings or treatments, such as a ceramic coating, a plasma surface treatment, a UV-light-ozone surface treatment, a surface thermal treatment, or any other suitable treatment to improve moisture resistance, and/or to protect other elements of the display component 100.

Figure 2:
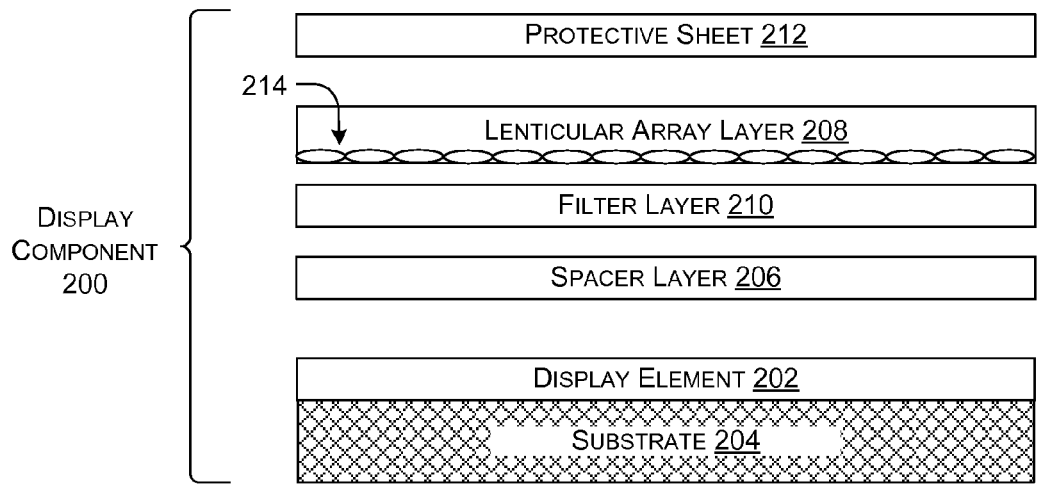
FIG. 2 illustrates an example schematic cross-section of a display component of a display stack associated with an electronic device.

FIG. 2 illustrates an example schematic cross-section of a display component 200 of a display stack associated with an electronic device. The display component 200 may include a display element 202 atop a structure substrate 204 that provides support and rigidity for the display component 200. In general, the display element 102 may include various types of image-displaying technology or components. For example, the display element may include reflective LCD elements, bi-stable LCD elements, MEMS display elements, interferometric modulator display elements, cholesteric display elements, electrophoretic display elements, reflective display elements, electrofluidic pixel display elements, electrowetting display elements, photonic ink or electronic paper display elements, gyricon display elements, and the like. In other implementations, image-displaying technology or components may include active matrix displays or display technology, such as TFT LCD display elements, plasma display elements, LED display elements, OLED display elements, and so forth. Accordingly, implementations of the display stack, display component, and/or display element described herein are not limited to any particular display technology.

In the illustrated example, a spacer layer 206 is positioned atop the display element 102. The spacer layer 206 may be formed as an air gap, a layer of lenticular lenses, or from an optically transparent material, such as polyurethane, polymethylmethacrylate (PMMA), polycarbonate (PC), polyethylene terephthalate (PT), silicone, cycloolefin polymer (COP), cycloolefin copolymer (COC), glass, or a combination thereof. As discussed above, the spacer layer 206 may be included in the display component to improve the overall viewing comfort by distancing or separating a lenticular array of a lenticular layer 208 from the pixels of the display element 202. However, in some implementations, an acceptable distance between the lenticular array and the pixels may be achieved by including other layers between the lenticular layer 208 and the display element 202, for instance a filter layer 208 as shown in the illustrated example.

The filter layer or filter glass 210 may be located atop the display element 202. The filter glass may include one or more of layers having antiglare properties, antireflective properties, and/or UV properties to provide additional protection to the display element 202. For example, the filter layer 210 may include a silicone material or a silicone OCA having desired refractive index or an acrylic material or an acrylic OCA having specific UV reflecting properties. In other examples, the filter layer 210 may include a material tuned to ensure that a resulting color of the display stack viewed by a user is correct or be manufactured with additives such a UV-absorbing agent.

The lenticular array layer 208 may be positioned atop the filter layer 210. As discussed above, the lenticular array includes an array of magnifying lenses aligned with the pixels of the display element 202. The magnifying lenses may be designed to alter a viewing angle associated with each of the pixels, such that the users views different images or the image at different depths with each eye and thereby the display component 200 is capable of producing a 3D image. In some cases, the lenticular array may be arranged with regards to the pixels of the display element 202, such that a 3D image may be produced by the display component 200 without the use of specialized viewing glasses or spectacles.

In some examples, the magnifying lenses of the lenticular array may be cylindrical or elliptical lenses with a front surface having a spherical or elliptical cross-section and a flat rear surface upon which the image is displayed. In some cases, each of the lenticular lenses 214 and/or the lenticular array layer 208 may range from about 1 mm thick to about 0.2 mm thick. In some cases, the lenticular array layer 208 may be about 0.5 mm thick.

In some instances, the lenticular array layer 208 may be formed by applying a wet coating of lacquer on top of the filter layer 210. The lenticular lenses or structures 214 may be embossed to the layer of lacquer using a mold, die, or roller having a pre-aligned pattern imprinted thereon. For example, a nickel based roller may be pre-fabricated based in part on the pixel arrangement, size, and shape associated with the display element 202. The nickel based roller may be run over the top surface of the lacquer and UV cured (e.g., using a Fusion lamp) as the roller moves along the top surface of the display component 200. In this manner, the lenticular structures 214 of the lenticular array are more accurately (e.g., within five microns) aligned with the pixels of the display element 202.

In the illustrated example, a protective sheet 212 is positioned atop the lenticular layer 208. The protective sheet 212 may be formed from an inorganic material (e.g., a plastic or polymer) or an inorganic material (e.g., glass). For example, the protective sheet 212 may be formed from a plastic material to further reduce the weight of the overall display component 200. In other cases, the protective sheet 212 may be formed from glass to further reduce the overall size of the substrate 204 and/or to provide additional strength and rigidity during assembly of the display stack to further improve yields. In some cases, the protective sheet 534 may be configured to have antiglare proprieties, antireflective properties, a particular refractive index, a particular luminous transmittance rating, or include other type of coatings or treatments, such as a ceramic coating, a plasma surface treatment, a UV-light-ozone surface treatment, a surface thermal treatment, or any other suitable treatment to improve moisture resistance, and/or to protect other elements of the display component 200.

Figure 3:
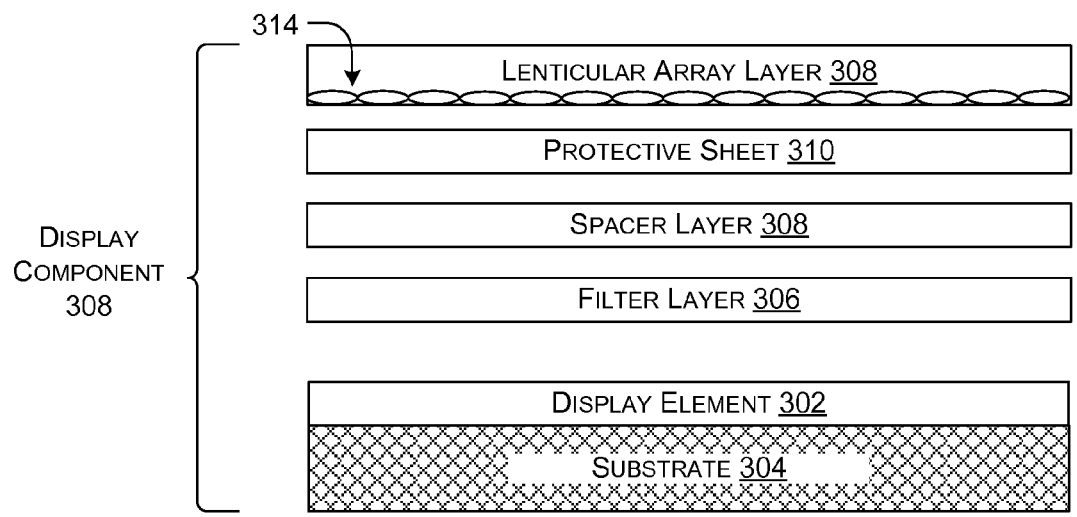
FIG. 3 illustrates an example schematic cross-section of a display component of a display stack associated with an electronic device.

FIG. 3 illustrates an example schematic cross-section of a display component of a display stack associated with an electronic device. The display component 300 may include a display element 302 atop a structure substrate 304 that provides support and rigidity for the display component 300, as discussed above with respect to FIGS. 1 and 2. In general, the display element 302 may include various types of image-displaying technology or components. For example, the display element may include reflective LCD elements, bi-stable LCD elements, MEMS display elements, interferometric modulator display elements, cholesteric display elements, electrophoretic display elements, reflective display elements, electrofluidic pixel display elements, electrowetting display elements, photonic ink or electronic paper display elements, gyricon display elements, and the like. In other implementations, image-displaying technology or components may include active matrix displays or display technology, such as TFT LCD display elements, plasma display elements, LED display elements, OLED display elements, and so forth. Accordingly, implementations of the display stack, display component, and/or display element described herein are not limited to any particular display technology.

In the illustrated example, a filter layer or filter glass 306 is located atop the display element 302. The filter glass may include one or more of layers having antiglare properties, antireflective properties, and/or UV properties to provide additional protection to the display element 302. For example, the filter layer 106 may include a silicone material or a silicone OCA having desired refractive index or an acrylic material or an acrylic OCA having specific UV reflecting properties. In other examples, the filter layer may include a material tuned to ensure that a resulting color of the display stack viewed by a user is correct or be manufactured with additives such a UV-absorbing agent.

The display component 300 may also include a spacer layer 308 positioned atop the filter layer 306. The space layer 308 may be included in the display component 300 to improve the overall viewing comfort of a user when viewing a 3D image by configuring a distance or separation of the lenticular lenses and the pixels of the display element 302. However, in some implementations, the desired distance or separation may be achieved by including other layers of the display component 300 between the display element 302 and a lenticular array layer 310. For instance, in the illustrated example, a protective layer 312 is positioned between the display element 302 and the lenticular array layer 310.

The lenticular array layer 310 includes an array of lenticular lenses or magnifying lenses 314 aligned with the pixels of the display element 302. The lenticular lenses may be designed to alter a viewing angle associated with each of the pixels, such that the users views different images or the image at different depths with each eye and thereby the display component 300 is capable of producing a 3D image. In some cases, the lenticular array may be arranged with regards to the pixels of the display element 302, such that a 3D image may be produced by the display component 100 without the use of specialized viewing glasses or spectacles.

In some instances, the lenticular array layer 310 may be formed by applying a wet coating of lacquer on top of the protective sheet 312. The lenticular lenses 314 or structures that form the lenticular array may be embossed to the layer of lacquer using a mold, die, or roller having a pre-aligned pattern imprinted thereon. In some cases, the lacquer may be UV cured or heat cured under pressure while the mold, die, or roller is in place to more accurately (e.g., within five microns) align the lenticular lens or structures 314 associated with the lenticular array with the pixels of the display element 302.

In the illustrated example, the protective sheet 312 is positioned between the spacer layer 308 and the lenticular array layer 310. The protective sheet 112 may be formed from an inorganic material (e.g., a plastic or polymer) or an inorganic material (e.g., glass). For example, the protective sheet 312 may be formed from a plastic material to further reduce the weight of the overall display component 100. In other cases, the protective sheet 312 may be formed from glass to further reduce the overall size of the substrate 304 and/or to provide additional strength and rigidity during assembly of the display stack to further improve yields. In some cases, the protective sheet 534 may be configured to have antiglare proprieties, antireflective properties, a particular refractive index, a particular luminous transmittance rating, or include other type of coatings or treatments, such as a ceramic coating, a plasma surface treatment, a UV-light-ozone surface treatment, a surface thermal treatment, or any other suitable treatment to improve moisture resistance, and/or to protect other elements of the display component 300.

FIG. 4 illustrates an example schematic cross-section of a display stack 400 of an electronic device. The display stack 400 includes a cover component 402, a front or back light component 404, a touch component 406, and a display component 408 (e.g., such as the display component 100, 200, or 300 of FIGS. 1-3). However, in the illustrated example, the lenticular array layer 410 has been incorporated into the touch component 406.

In some implementations, the cover component 402 may be configured to run the entire width and height of the electronic device to provide some degree of structural support to the electronic device, as well as to improve the electronic devices resistance to bending and/or snapping. Additionally, the cover component 402 may be configured as the outermost layer of the display stack 400 to protect the display from damage, such as scratching, chipping, peeling, as well as to provide rigidity and stiffness to the overall electronic device. In some cases, the cover component 402 may be formed from various layers, such as a cover glass 412 and/or an outer layer 414 applied to the cover glass 412. For example, the outer layer 414 may be applied to the cover glass 412 to provide antiglare proprieties, antireflective properties, anti-smudging or anti-fingerprinting properties, anti-cracking properties, among others. In some cases, the outer layer 414 may be a film or coating applied to the top surface of the cover glass 412. In other cases, the outer layer 414 may be an etching applied to the cover layer 412 to, for example, generate a predetermined refractive index or luminous transmittance rating.

In the illustrated example, the front or back light component 404 is located below the cover component 402 and generally includes a lightguide 416 connected to a light source (not shown). The lightguide 416 as illustrated is surrounded on the top and bottom by a layer of OCA 418 and 420, respectively. The lightguide 416 may include a substrate (not shown) formed from a transparent thermoplastic (such as PMMA), a layer of lacquer and multiple grating elements that function to propagate light from the light source towards the top surface of the display stack 400, thus illuminating the content presented on the display. For example, the lightguide 416 may be formed by applying a layer of lacquer to the substrate to create the grating elements of the lightguide 416, the grating elements may be embossed to the layer of lacquer, and the lightguide 416 may be UV-cured. Alternatively, the substrate of the lightguide 416 and the grating elements may be manufactured as a single element, such as via an injection molding process. In some instances, the UV lacquer is made of a cross-linked, tri-functional polymer material that co-polymerizes to a plastic solid when exposed to a high-intensity UV light source.

The layers of OCA 418 and 420 above and below the lightguide 416 help maintain the light generated by the light source within the lightguide 416. In general, an OCA, such as a Liquid OCA (LOCA) or solid OCA (SOCA), may be applied by depositing the OCA onto the lightguide 416 and, when the OCA reaches the corners of the display stack 400, the corners may be UV-cured. Thereafter, the OCA on the remaining portion of the lightguide 416 may be UV-cured. In other instance, the LOCA or the SOCA may be formed from an acrylic material and/or, in some instances, from silicone. In some cases, the LOCA may be using a wet coating method immediately followed by embossing and UV curing (e.g., using a Fusion lamp).

In the illustrated example, the touch component 406 is arranged below the front or back light component 404 and includes one or more touch sensing layers 422 and 424 (e.g., rows and/or columns that form a grid or diamond shape) applied to one or more surfaces of a substrate 426 coupled to a touch controller (not shown). For instance, in the illustrated example, the touch sensing layer 422 (e.g., the rows) is applied to the top surface of the substrate 426 and the touch sensing layer 424 (e.g., the columns) is applied to the bottom surface of the substrate 426 or vice versa. In some particular implementations, the touch component 406 may include a single touch sensing layer or a single layer multi-touch pattern (e.g., both the rows and columns) applied to one side of the substrate 426.

The touch sensing layers 422 and 424 may include traces made from ITO, copper, printed ink, metal mesh technologies, silver nanowires, carbon nanotubes, or the like. For example, the touch sensing layers 422 and 424 may be formed by depositing traces of ITO onto the surfaces of the substrate 426, printing a conductive ink on the surfaces of the substrate 426, or adhering or laminating a pre-formed metal mesh technology or wiring (e.g., silver nanowires or carbon nanotubes) to the surfaces of the substrate 426. In some specific implementations, traces of ITO may be deposited or patterned onto the surfaces of the substrate 426, for example, using physical vapor deposition, electron beam evaporation, or sputter deposition techniques, among others.

In the illustrated example, the touch component 406 also includes the lenticular array layer 410. As discussed above, the lenticular array includes an array of magnifying lenses aligned with the pixels of the display element 428 of the display component 408. The magnifying lenses may be designed to alter a viewing angle associated with each of the pixels, such that the user views different images or the image at different depths with each eye and thereby the display stack 400 is capable of producing a 3D image. In some cases, the lenticular array may be arranged with regards to the pixels of the display element 428, such that a 3D image may be produced by the display stack 400 without the use of specialized viewing glasses or spectacles.

In some examples, the magnifying lenses of the lenticular array may be cylindrical or elliptical lenses with a front surface having a spherical or elliptical cross-section and a flat rear surface upon which the image is displayed. In some cases, each of the lenticular lenses and/or the lenticular array layer 410 may range from about 1 mm thick to about 0.2 mm thick. In some cases, the lenticular array layer 208 may be about 0.5 mm thick.

In the illustrated example, the lenticular array layer 410 is shown below touch sensing layer 424, however, in other examples, the lenticular array layer 410 may be positioned above the touch sensing layer 422 or between the touch sensing layers 422 and 424, for instance, adjacent to or applied directly to the substrate 426. In general, the lenticular array layer 410 may be formed by applying a wet coating of lacquer on a bottom surface of the touch sensing layer 424. The lenticular lenses or structures may be embossed to the layer of lacquer using a mold, die, or roller having a pre-aligned pattern imprinted thereon. For example, nickel based rollers may be pre-fabricated based in part on the pixel arrangement, size, and shape associated with the display element 428 and/or the display stack 400. The nickel based rollers may be run or rolled over the top surface of the lacquer and UV cured as the touch component 406 is pushed through the rollers along the top surface of the touch component 406. In this manner, the lenticular structures of the lenticular array are more accurately (e.g., within five microns) aligned with the pixels of the display element 428.

The display component 408 resides below the touch component 406 within the display stack 400. The display component 408 may be responsible for generating or producing the images to be displayed to the user by the display stack 400 and/or the electronic device. In general, the display component 400 may include the display element 428 affixed atop a structure substrate 430 that provides support and rigidity for the display component 408 and the display stack 400.

The display element 428 may include various types of image-displaying technology or components. For example, the display element may include reflective LCD elements, bi-stable LCD elements, MEMS display elements, interferometric modulator display elements, cholesteric display elements, electrophoretic display elements, reflective display elements, electrofluidic pixel display elements, electrowetting display elements, photonic ink or electronic paper display elements, gyricon display elements, and the like. In other implementations, image-displaying technology or components may include active matrix displays or display technology, such as TFT LCD display elements, plasma display elements, LED display elements, OLED display elements, and so forth. Accordingly, implementations of the display stack, display component, and/or display element described herein are not limited to any particular display technology.

In the illustrated example, a filter layer or filter glass 432 is located atop the display element 428. The filter glass may include one or more of layers having antiglare properties, antireflective properties, and/or UV properties to provide protection to the display element 428 in addition to the cover component 402. For example, the filter layer 432 may include a silicone material or a silicone OCA having desired refractive index or an acrylic material or an acrylic OCA having specific UV reflecting properties. In other examples, the filter layer may include a material tuned to ensure that a resulting color of the display stack viewed by a user is correct or be manufactured with additives such a UV-absorbing agent.

The display component 408 may also include a protective sheet 434 as the upper most layer of the display component 408. The protective sheet 434 may be formed from an inorganic material (e.g., a plastic or polymer) or an inorganic material (e.g., glass). For example, the protective sheet 434 may be formed from a plastic material to further reduce the weight of the overall display component 408 and the display stack 400. In other cases, the protective sheet 434 may be formed from glass to further reduce the overall size of the substrate 430 and/or to provide additional strength and rigidity during assembly of the display stack to further improve yields. In some cases, the protective sheet 534 may be configured to have antiglare proprieties, antireflective properties, a particular refractive index, a particular luminous transmittance rating, or include other type of coatings or treatments, such as a ceramic coating, a plasma surface treatment, a UV-light-ozone surface treatment, a surface thermal treatment, or any other suitable treatment to improve moisture resistance, and/or to protect other elements of the display component 400.

FIG. 5 illustrates an example schematic cross-section of a display stack 500 of an electronic device. The display stack 500 includes a cover component 502, a front or back light component 504, a touch component 506, and a display component 508 (e.g., such as the display component 100, 200, or 300 of FIGS. 1-3). However, in the illustrated example, the lenticular array layer 510 has been incorporated into the cover component 402.

In general, the cover component 502 may be configured to run the entire width and height of the electronic device to provide some degree of structural support to the electronic device, as well as to improve the electronic devices resistance to bending and/or snapping. Additionally, the cover component 502 may be configured as the outermost layer of the display stack 500 to protect the display from damage, such as scratching, chipping, peeling, as well as to provide rigidity and stiffness to the overall electronic device. In some cases, the cover component 502 may be formed from various layers, such as a cover glass 512 and/or an outer layer 514 applied to the cover glass 512. For example, the outer layer 514 may be applied to the cover glass 512 to provide antiglare proprieties, antireflective properties, anti-smudging or anti-fingerprinting properties, anti-cracking properties, among others. In some cases, the outer layer 514 may be a film or coating applied to the top surface of the cover glass 512. In other cases, the outer layer 514 may be an etching applied to the cover layer 512 to, for example, generate a predetermined refractive index or luminous transmittance rating.

In the illustrated example, the cover component 502 also includes the lenticular array layer 510. As discussed above, the lenticular array includes an array of magnifying lenses aligned with the pixels of the display component 508. The magnifying lenses may be designed to alter a viewing angle associated with each of the pixels, such that the user views different images or the image at different depths with each eye and thereby the display stack 500 is capable of producing a 3D image. In some cases, the lenticular array may be arranged with regards to the pixels, such that a 3D image may be produced by the display stack 500 without the use of specialized viewing glasses or spectacles.

In some examples, the magnifying lenses of the lenticular array may be cylindrical or elliptical lenses with a front surface having a spherical or elliptical cross-section and a flat rear surface upon which the image is displayed or passed. In some cases, each of the lenticular lenses and/or the lenticular array layer 510 may range from about 1 mm thick to about 0.2 mm thick. In some cases, the lenticular array layer 510 may be about 0.5 mm thick.

In the illustrated example, the lenticular array layer 510 is shown as applied to a bottom surface of the cover glass 412, however, in other examples, the lenticular array layer 510 may be positioned below a touch sensing layer (not shown) associated with the cover component 502 or between the touch sensing layers of the cover component 502 and the cover glass 512. In general, the lenticular array layer 510 may be formed by applying a wet coating of lacquer on a bottom surface of the cover glass 512. The lenticular lenses or structures may be embossed to the layer of lacquer using a mold, die, or roller having a pre-aligned pattern imprinted thereon. For example, rollers may be pre-fabricated based in part on the pixel arrangement, size, and shape associated with the display component 508 and/or the display stack 500. The imprinted rollers may be run over the surface of the lacquer and UV cured as the cover component 502 is pushed through the rollers. In this manner, the lenticular structures of the lenticular array may be more accurately (e.g., within five microns) aligned with the pixels of the display component 508.

In the illustrated example, the front or back light component 504 is located below the cover component 502 and generally includes a lightguide 516 connected to a light source (not shown). The lightguide 516 as illustrated is surrounded on the top and bottom by a layer of OCA 518 and 520, respectively. The lightguide 516 may include a substrate (not shown) formed from a transparent thermoplastic (such as PMMA), a layer of lacquer and multiple grating elements that function to propagate light from the light source towards the top surface of the display stack 400, thus illuminating the content presented on the display. For example, the lightguide 416 may be formed by applying a layer of lacquer to the substrate to create the grating elements of the lightguide 516, the grating elements may be embossed to the layer of lacquer, and the lightguide 516 may be UV-cured. Alternatively, the substrate of the lightguide 516 and the grating elements may be manufactured as a single element, such as via an injection molding process. In some instances, the UV lacquer is made of a cross-linked, tri-functional polymer material that co-polymerizes to a plastic solid when exposed to a high-intensity UV light source.

The layers of OCA 518 and 520 above and below the lightguide 516 help maintain the light generated by the light source within the lightguide 516. In general, an OCA, such as a LOCA or SOCA, may be applied by depositing the OCA onto the lightguide 516 and, when the OCA reaches the corners of the display stack 500, the corners may be UV-cured. Thereafter, the OCA on the remaining portion of the lightguide 516 may be UV-cured. In other instance, the LOCA or the SOCA may be formed from an acrylic material and/or, in some instances, from silicone. In some cases, the LOCA may be using a wet coating method immediately followed by embossing and UV curing (e.g., using a Fusion lamp).

In the illustrated, the touch component 506 is arranged blew the front or back light component 504 and includes one or more touch sensing layers 522 and 524 (e.g., rows and/or columns that form a grid or diamond shape) applied to one or more surfaces of a substrate 526 coupled to a touch controller (not shown). For instance, in the illustrated example, the touch sensing layer 522 (e.g., the rows) is applied to the top surface of the substrate 526 and the touch sensing layer 524 (e.g., the columns) is applied to the bottom surface of the substrate 526 or vice versa. In some particular implementations, the touch component 506 may include a single touch sensing layer or a single layer multi-touch pattern (e.g., both the rows and columns) applied to one side of the substrate 526.

The touch sensing layers 522 and 524 may include traces made from ITO, copper, printed ink, metal mesh technologies, silver nanowires, carbon nanotubes, or the like. For example, the touch sensing layers 522 and 524 may be formed by depositing traces of ITO onto the surfaces of the substrate 526, printing a conductive ink on the surfaces of the substrate 526, or adhering or laminating a pre-formed metal mesh technology or wiring (e.g., silver nanowires or carbon nanotubes) to the surfaces of the substrate 526. In some specific implementations, traces of ITO may be deposited or patterned onto the surfaces of the substrate 426, for example, using physical vapor deposition, electron beam evaporation, or sputter deposition techniques, among others.

In the illustrated example, the display component 508 resides below the touch component 506 within the display stack 500. The display component 408 may be responsible for generating or producing the images to be displayed to the user by the display stack 500 and/or the electronic device. In general, the display component 508 may include a display element 528 affixed atop a structure substrate 530 that provides support and rigidity for the display component 508 and the display stack 500.

The display element 528 may include various types of image-displaying technology or components. For example, the display element may include reflective LCD elements, bi-stable LCD elements, MEMS display elements, interferometric modulator display elements, cholesteric display elements, electrophoretic display elements, reflective display elements, electrofluidic pixel display elements, electrowetting display elements, photonic ink or electronic paper display elements, gyricon display elements, and the like. In other implementations, image-displaying technology or components may include active matrix displays or display technology, such as TFT LCD display elements, plasma display elements, LED display elements, OLED display elements, and so forth. Accordingly, implementations of the display stack, display component, and/or display element described herein are not limited to any particular display technology.

In the illustrated example, a filter layer or filter glass 532 is located atop the display element 528. The filter glass may include one or more of layers having antiglare properties, antireflective properties, and/or UV properties to provide protection to the display element 528 in addition to the cover component 502. For example, the filter layer 532 may include a silicone material or a silicone OCA having desired refractive index or an acrylic material or an acrylic OCA having specific UV reflecting properties. In other examples, the filter layer may include a material tuned to ensure that a resulting color of the display stack viewed by a user is correct or be manufactured with additives such a UV-absorbing agent.

The display component 508 may also include a protective sheet 534 as the upper most layer of the display component 508. The protective sheet 534 may be formed from an inorganic material (e.g., a plastic or polymer) or an inorganic material (e.g., glass). For example, the protective sheet 534 may be formed from a plastic material to further reduce the weight of the overall display component 408 and the display stack 500. In other cases, the protective sheet 534 may be formed from glass to further reduce the overall size of the substrate 530 and/or to provide additional strength and rigidity during assembly of the display stack to further improve yields. In some cases, the protective sheet 534 may be configured to have antiglare proprieties, antireflective properties, a particular refractive index, a particular luminous transmittance rating, or include other type of coatings or treatments, such as a ceramic coating, a plasma surface treatment, a UV-light-ozone surface treatment, a surface thermal treatment, or any other suitable treatment to improve moisture resistance, and/or to protect other elements of the display component 508.

FIGS. 4 and 5 illustrate the lenticular array layer incorporated into various other components of the display stack. In some cases, the location of the lenticular array layer is based on a desired distance or separation between the pixels of the display element 528 and the lenticular lenses or structures of the lenticular array layer 510. For example, the thickness of each layer of the display stack continues to be reduced as manufactures compete to produce thinner lighter electronic devices. Thus, by locating the lenticular array layer nearer and nearer the top of the display stack (for example, within the cover component) the distance or separation between the lenticular lenses or structures and the pixels may be maintained within the desired range (e.g., 50 to 100 microns), as the thickness associated with each particular layer of the display stack is reduced.

Figure 6:
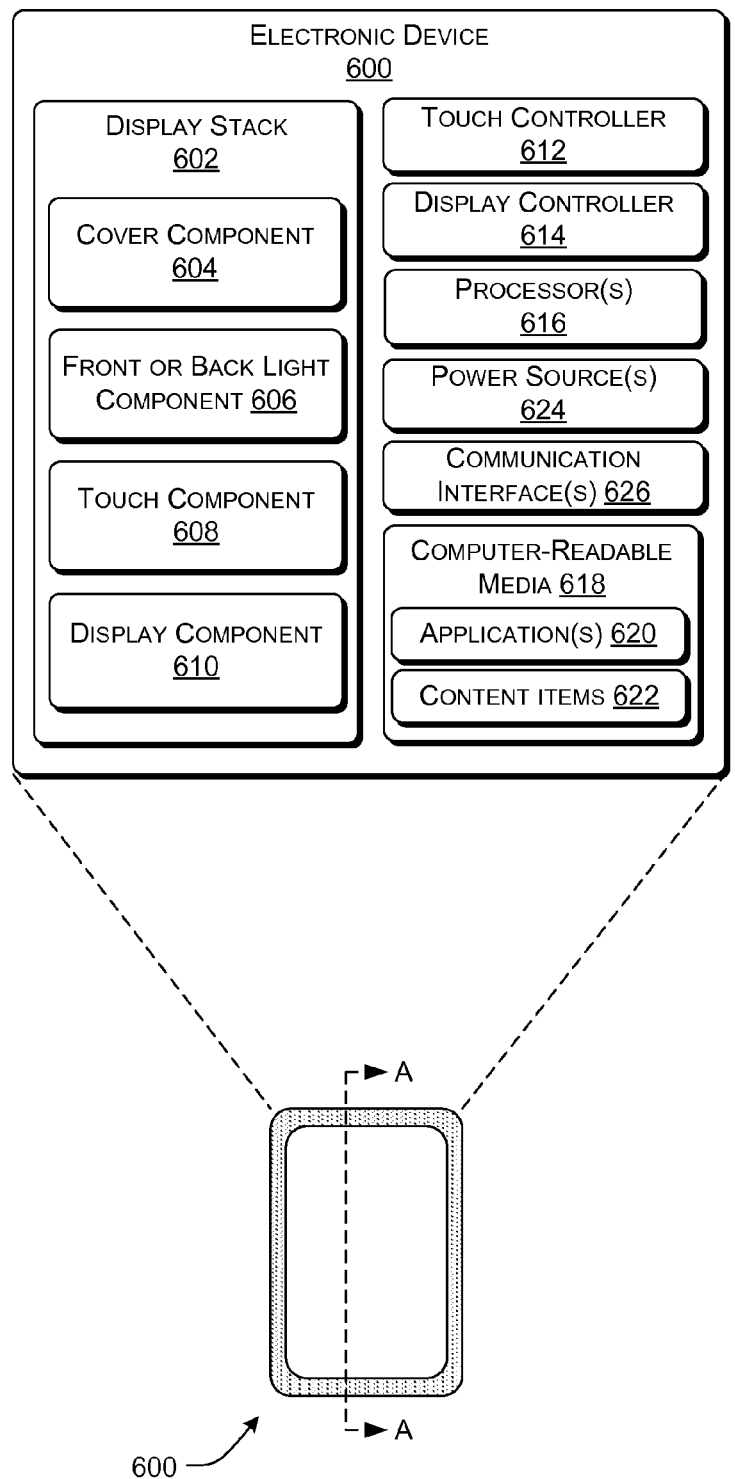
FIG. 6 illustrates an example electronic device that includes a display stack for rendering three dimensional images.

FIG. 6 illustrates an example electronic device 600 that includes a display stack 602 for rendering 3D images. The device 600 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 6 illustrates several example components of the electronic device 600, it should be appreciated that the device 600 may also include other conventional components, such as an operating system, system busses, input/output components, and the like.

The display stack 602 includes the cover component 604, a front or back light component 606, a touch component 608 and a display component 610. In some implementations, various components, such as the cover component 604, touch component 608, and/or the display component 610, may include a lenticular array layer formed by applying a layer of lacquer to a surface associated with the particular component and embossing lenticular lenses or structures from the layer of lacquer while curing.

In some cases, the cover component 604 may be configured to protect the display from damage, such as scratching, chipping, peeling, as well as to provide rigidity and stiffness to the overall electronic device 600. Thus, the cover component 604 may be configured to run the entire width and height of the electronic device 600 and also be manufactured to have a hardness rating that is resistant to at least 3H pencil. In some cases, the cover component 604 may include various layers formed from transparent inorganic materials and/or from transparent organic materials.

The electronic device may also include a front or back light component 506 for lighting the display stack 500. The front or back light component 506 may include a light guide portion and a light source. The light guide portion can include a substrate including a transparent thermoplastic polymer. For example, the light guide portion may include an acrylic polymer. In one implementation, the light guide portion can include PMMA. In a particular implementation, the light guide portion can include a substrate, a layer of lacquer and multiple grating elements formed in the layer of lacquer. The multiple grating elements may be configured to propagate light to illuminate the display component 508.

Furthermore, the amount of light emitted by the front light component 506 may vary. For instance, upon a user opening a cover of the electronic device, the light from the front light or back component 506 may gradually increase to its full illumination. In some instances, the electronic device includes an ambient light sensor and the amount of illumination of the front or back light component 506 may be based at least in part on the amount of ambient light detected by the ambient light sensor. For example, the front or back light component 506 may be dimmer if the ambient light sensor detects relatively little ambient light, such as in a dark room; can be brighter if the ambient light sensor detects ambient light within a particular range; and may be dimmer or turned off if the ambient light sensor detects a relatively large amount of ambient light, such as direct sunlight.

The device 600 may also include a touch component 608 and a touch controller 612. In some instances, at least one touch component 608 resides atop the display component 610 to form a touch-sensitive display (e.g., an electronic paper touch-sensitive display) that is capable of both accepting user input and displaying content corresponding to the input. The touch component 608 may comprise a capacitive touch sensor, a force sensitive resistance (FSR), an interpolating force sensitive resistance (IFSR) sensor, or any other type of touch sensor. In some instances, the touch component 608 is capable of detecting touches as well as determining an amount of pressure or force of these touches.

The display stack 602 also includes a display component 610 and a corresponding display controller 614. For instance, the display stack 602 may include a display component 610 that may present content via one or more image producing technologies. In various examples, the display component 610 may include a reflective display, such as an electronic paper display, a reflective LCD, or the like. In other implementations, or for other types of electronic devices 600, the display component 610 may include an active display such as a LCD, a plasma display, a LED display, an OLED display, and so forth. Accordingly, implementations herein are not limited to any particular display technology.

In some examples, the settings of the display component 610 may vary depending on the state of the front or back light component 606 (e.g., on or off), or based on the amount of light provided by the front or back light component 606. For instance, the electronic device 600 may implement a larger default font or a greater contrast when the front or back light component 606 is off compared to when the front light component 606 is on. In some instances, the electronic device 600 maintains, when the front or back light component 606 is on, a contrast ratio for the display component 610 that is within a certain defined percentage of the contrast ratio when the front or back light component 606 is off.

The electronic device 600 also includes one or more processors 616 and computer-readable media 618. Depending on the configuration of the electronic device 600, the computer-readable media 618 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 616.

The computer-readable media 618 may be used to store any number of functional components that are executable on the processors 616, as well applications 620 and content items 622. Thus, the computer-readable media 618 may include an operating system and a storage database to store one or more content items, such as eBooks, audio books, songs, videos, still images, and the like. The computer-readable media 618 of the electronic device 600 may also store one or more content presentation applications to display content on the device 600. The content presentation applications may be implemented as various applications 622 depending upon the content items 622. For instance, one of the applications 620 may be an electronic book reader application for rending textual electronic books, an audio player for playing audio books or songs, a video player for playing video, and so forth.

The electronic device 600 may also includes one or more power sources 624 for providing power to the display stack 602 and one or more communication interfaces 626 to facilitate communication between one or more networks (such as the Internet or one or more local area networks) and/or directly with one or more devices. The communication interfaces 626 may also facilitate communication between one or more wireless access points, a master device, and/or one or more other computing devices as part of an ad-hoc or home network system. The communication interfaces 626 may support both wired and wireless connection to various networks, such as cellular networks, radio, WiFi networks, short-range or near-field networks (e.g., Bluetooth®), infrared signals, local area networks, wide area networks, the Internet, and so forth.

Figure 7:
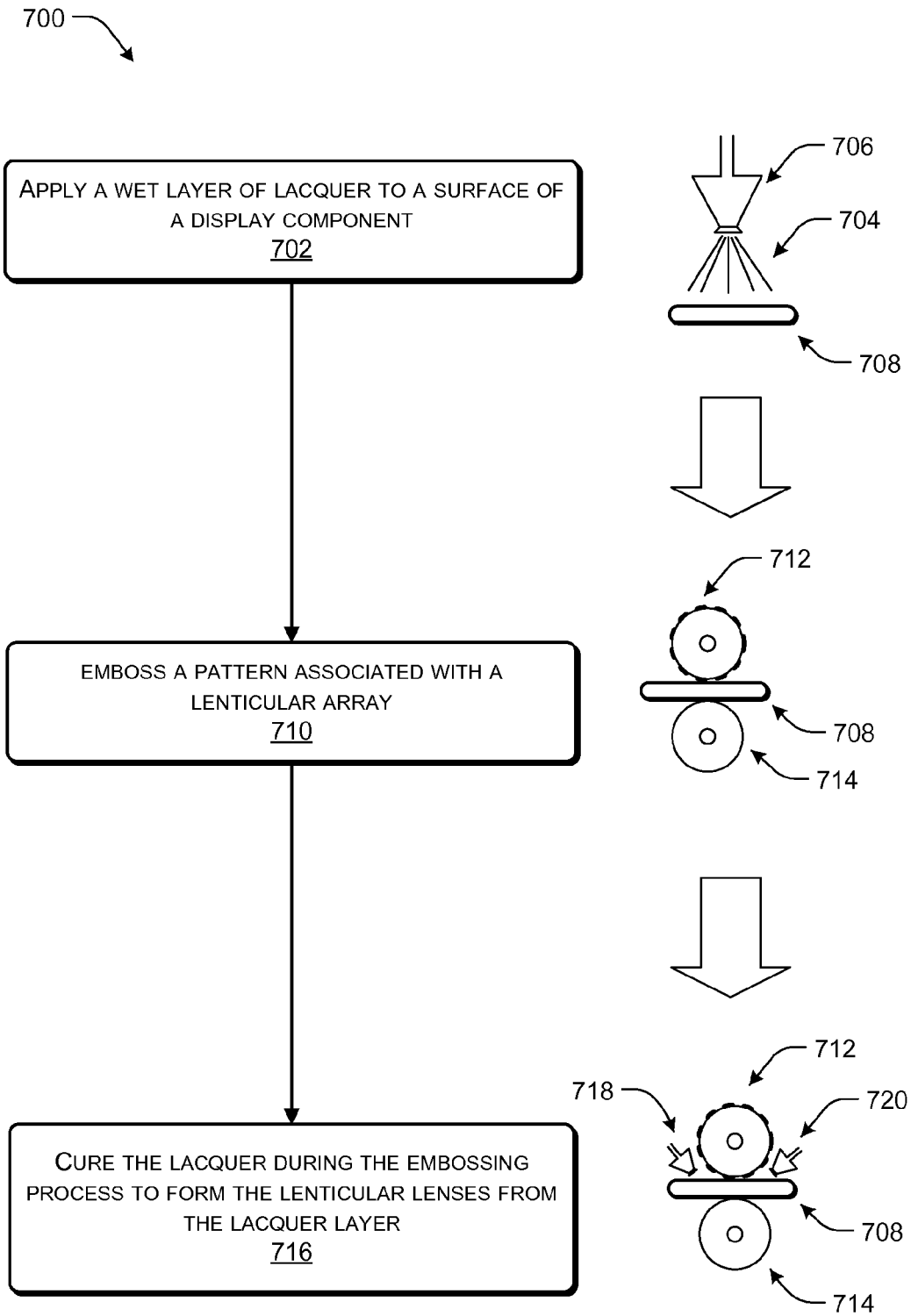
FIG. 7 illustrates an example flow diagram showing an illustrative process for forming the display component of FIGS. 1-3.
Figure 8:
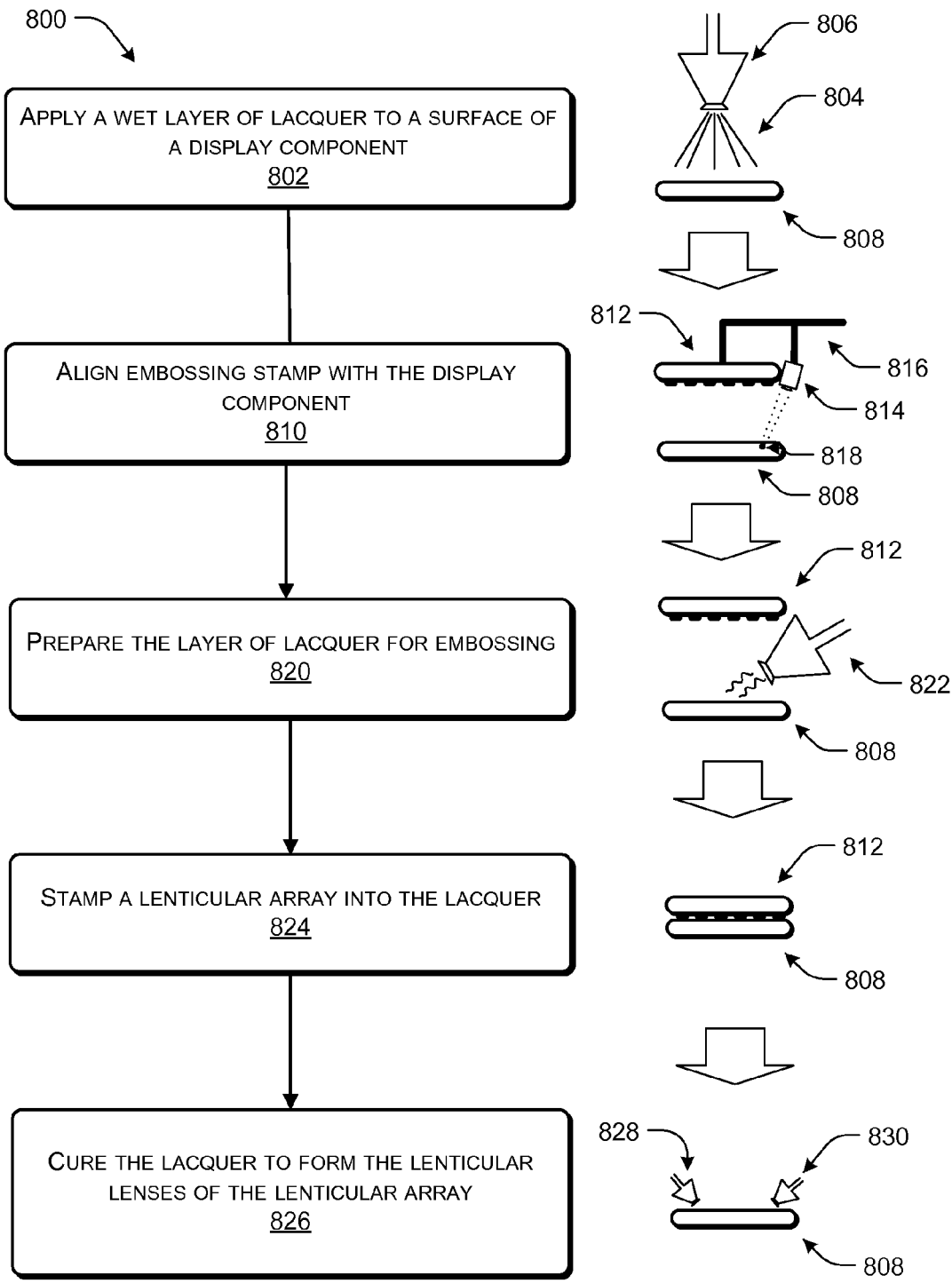
FIG. 8 illustrates another example flow diagram showing an illustrative process for forming the display component of FIGS. 1-3.
Figure 9:
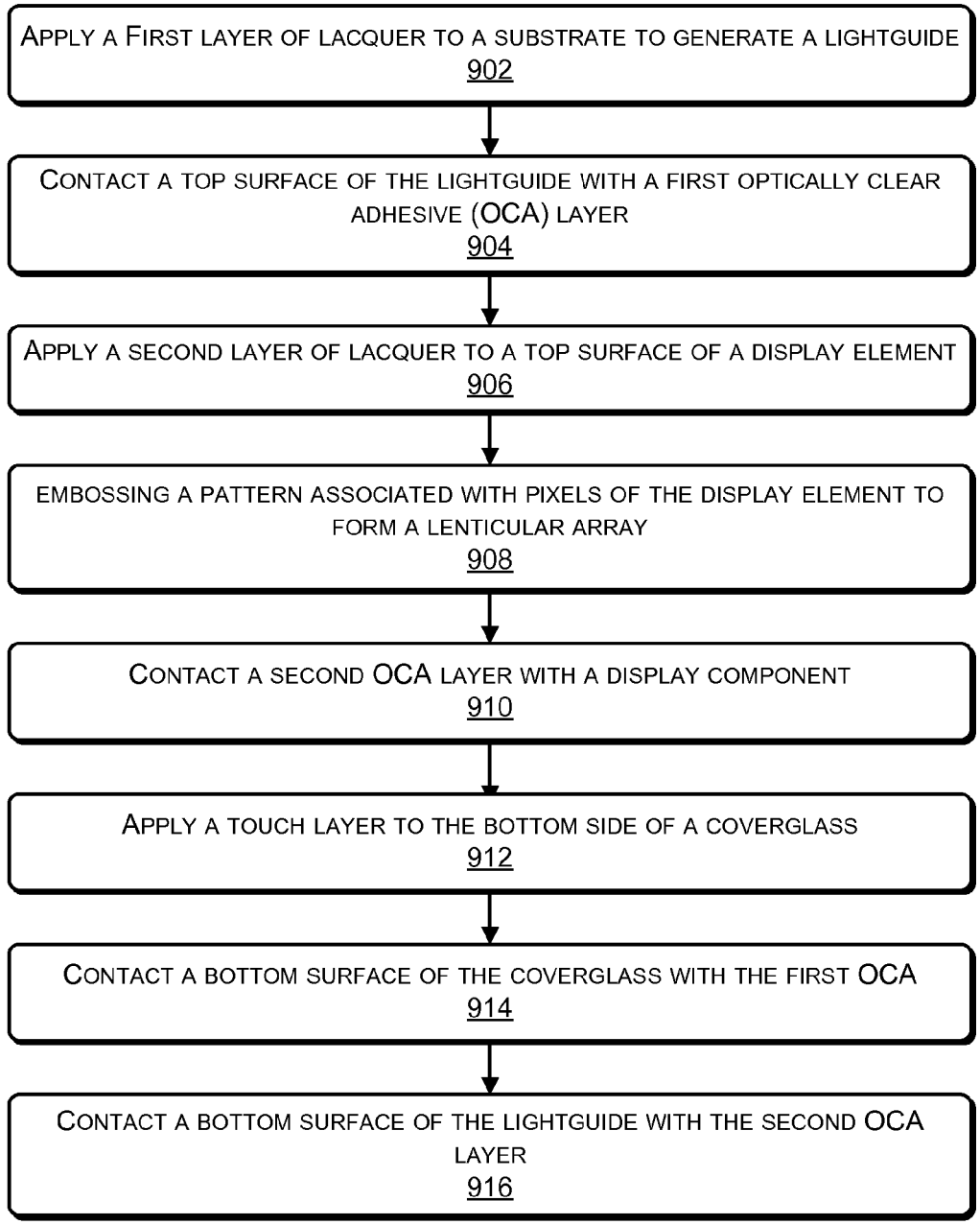
FIG. 9 illustrates an example flow diagram showing an illustrative process for forming the display stack of FIGS. 4 and 5.

FIGS. 7-9 are flow diagrams illustrating example processes for generating a display component as described above. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 7 illustrates an example flow diagram showing an illustrative process 700 for forming the display component of FIGS. 1-3. The process 700 includes one possible example for forming the 3D display component having the lenticular array layer embossed out of a layer of lacquer applied to a surface associated with the display component to provide an optically improved and more structurally sound display stack. For instance, in some cases, the lenticular array may be prefabricated as part of a plastic film that may be laminated into the display component. However, when a lamination process is utilized, the lenticular lenses or structures of the lenticular array are susceptible to misalignment with regards to the pixels of the display element of the display component due to warping of the plastic film when heated or cured. The misalignment may then result in signal loss or reduce optical quality of the resulting 3D display component, the overall display stack and/or the electronic device.

At 702, a wet layer of lacquer 704 is applied by a sprayer 706 to a surface of the display component 708. For example, the wet layer of lacquer 704 may be applied to a top surface of a display element responsible for generating the image, a surface associated with a spacer layer responsible for maintaining a desired distance between the pixels of the display element and the lenticular lenses or structures of the lenticular array layer, a surface associated with a filter glass or layer responsible for protecting the pixels of the display element, and/or a surface associated with a protective sheet responsible for protecting other layers of the display component 708.

In the illustrated example, the layer of lacquer 704 is applied by spraying the surface of the display component 708; however, in other examples the wet lacquer 704 may be applied by dipping, coating, or painting the surface of the display component 708. For instance, a robotic arm may evenly apply or paint the layer of lacquer 704 micron by micron across the surface.

At 710, a pattern associated with a lenticular array is embossed into the layer of lacquer 704 using an imprinted pattern roller 712, as well as a second roller 714. In the illustrated example, an imprinted pattern roller 712 is utilized to emboss the lacquer 704; however, in other implementations a die, mold, plate, etc. may be utilized in lieu of the roller 712. In general, the display component 708 is pushed or forced through the opposing rollers 712 and 714, such that the imprinted pattern roller 712 leaves a resulting pattern of lenticular lenses or structures aligned with the pixels of the display element.

At 716, the lacquer 704 is cured while the rollers 712 and 714 are imprinting the lenticular lenses or structures into the lacquer 704. For example, one or more Fusion lamps 718 or 720 may be directed at the lacquer 704 to harden or cure the lenticular lenses or structures in places. For example, after the rollers 712 and 714 imprint the lenticular lenses or structures into the layer of lacquer 704 the Fusion lamp 718 may be utilized to cure the lenticular lenses or structures in place. Additionally, in some implementations, a second Fusion lamp 720 may be utilized to begin curing or hardening the lacquer 704 prior to the rollers 712 and 714 imprinting the lenticular lenses or structures.

FIG. 8 illustrates an example flow diagram showing an illustrative process 800 for forming the display component of FIGS. 1-3. The process 800 includes one possible example for forming the 3D display component having the lenticular array layer out of a layer of material, such as lacquer, applied to a surface associated with the display component to provide an optically improved and more structurally sound display stack. For instance, in some cases, the lenticular array may be prefabricated as part of a plastic film that may be laminated into the display component. However, when a lamination process is utilized, the lenticular lenses or structures of the lenticular array are susceptible to misalignment with regards to the pixels of the display element of the display component due to warping of the plastic film when heated or cured. The misalignment may then result in signal loss or reduce optical quality of the resulting 3D display component, the overall display stack and/or the electronic device.

At 802, a wet layer of lacquer 804 is applied by a sprayer 806 to a surface of the display component 808. For example, the wet layer of lacquer 804 may be applied to a top surface of a display element responsible for generating the image, a surface associated with a spacer layer responsible for maintaining a desired distance between the pixels of the display element and the lenticular lenses or structures of the lenticular array layer, a surface associated with a filter glass or layer responsible for protecting the pixels of the display element, and/or a surface associated with a protective sheet responsible for protecting other layers of the display component 808.

In the illustrated example, the layer of lacquer 804 is applied by spraying the surface of the display component 808; however, in other examples the wet lacquer 804 may be applied by dipping, coating, or painting the surface of the display component 808. For instance, a robotic arm may evenly apply or paint the layer of lacquer 804 micron by micron across the surface. In still other examples, the layer of lacquer 804 may be replaced with a layer of resign, thermal plastic material, epoxy, solvent curable material, and/or chemical embossing material.

At 810, the embossing stamp 812 is aligned with the display component 808. For instance, in the illustrated example, a camera 814 is connected or coupled to the stamp 812 via, for instance, a mechanical arm 816. The camera 814 may be configured to locate one or more marks, generally indicated by 818, on the display component 808 and to cause the mechanical arm 816 to adjust the positioning of the stamp 812 based on the detected location of the mark 818. In some specific examples, the mark 818 detected by the camera 814 or other optical device may be the pixels of the display component, a center of the pixels of the display component, one or more particular of the pixels (e.g., the corner pixels or a center pixel) of the display component, etc. In yet other examples, identifying the mark 818 and adjusting the position of the stamp 812 may include identifying by the camera 814 may include detecting one or more edges of the display component.

In the illustrated example, a single camera 814 is shown. However, in other examples, multiple cameras may be used in place of the camera 814. In some cases, each of the multiple cameras may be configured to identify particular pixels of the display component or particular marks 818 associated with the display component. Additionally, in the illustrated example, the camera 814 is shown connected to the stamp 812 via the mechanical arm 816. However, in some implementations, the camera 814 may be incorporated into the stamp 812 to further improve the alignment between the pixels and the lenticular structures or lenses.

At 820, the layer of lacquer 804 (or other material) is prepared for embossing or stamping. For example, depending on the material selected, additional processing or treatment of materials may be performed before forming the lenticular array. Thus, in the illustrated example, the material is shown as being heated or treated with a chemical or solvent by sprayer 822 in order to allow the material to be embossed or stamped. In other examples, a machine (not shown) may trace, based at least in part on the optical alignment or on a three dimensional scan of the pixels or markings on the display stack, a pattern associated with lenticular array while applying a chemical or solvent.

At 824, a pattern associated with a lenticular array is embossed into the layer of lacquer 804 using a stamp 812. In the illustrated example, the stamp 812 is utilized to emboss the lacquer 804; however, in other implementations a die, mold, roller, etc. may be utilized in lieu of the stamp 812. Additionally, in other examples, the stamp 812 may be a machine or device configured to trace a pattern associated with the lenticular array over the layer of lacquer 808 and apply a chemical or solvent to the layer of lacquer 808 to form the lenticular array.

At 826, the lacquer 804 is cured to fix the lenticular lenses or structures in place. For example, one or more Fusion lamps 828 or 830 may be directed at the lacquer 804 to harden or cure the lenticular lenses or structures. For example, after the stamp 812 imprints the lenticular lenses or structures into the layer of lacquer 804 the Fusion lamps 828 and 830 may be directed at the lacquer to cure the lenticular lenses or structures in place.

FIGS. 7 and 8 provide examples for forming the lenticular array in place and aligned with the pixels of the display element. However, other implementations for forming the lenticular array in place may be utilized. For example, the lenticular structures may be built in place using 3D printing or other process. In other examples, the lenticular array may be formed by forming a layer of thermal plastic over the display stack and applying heat, solvents, or other chemical applying in a defined pattern to remove portion of the thermal plastic that are unwanted. In still other examples, the lenticular array may be formed by applying a wet layer of material over the display stack. Positive and/or negative charges may be applied to cause the particles of the wet layer to move or arrange into desired pattern to form the lenticular structures. The wet layer may be heated or cured while the charges maintain the material in the desired pattern.

FIG. 9 illustrates an example flow diagram showing an illustrative process 900 for forming the display stack of FIGS. 4 and 5. For example, a display stack may include a cover component, a front light component, a display component, and/or one or more layers of OCA. At 902, a first layer of lacquer is applied to a substrate to generate a lightguide. For example, the first layer of lacquer may be applied to a PMMA plastic substrate, together with multiple grating elements that function to propagate light from the light source towards the top surface of the display stack. In some examples, the grating elements may be configured to stick out or extend outwards into the lacquer to form a positive relief. The lightguide may then be UV-cured or hardened.

At 904, the lightguide is contacted with a first layer of OCA. The OCA may be a film or a liquid. The first layer of OCA may have a predetermined refractive index (e.g., between 1.3 to about 1.51) and based at least in part on an amount and thickness of the OCA layer. For example, the OCA may be may be between 80 and 200 micrometers (um) thick. In other cases, the first OCA layer may have a predetermined luminous transmittance rating (e.g., 90% or greater above 400 nanometer (nm) wavelengths, 5% or less below 300 nm wavelength)

At 906, a second layer of lacquer is applied to a surface of the display component. For example, the second layer of layer of lacquer may be applied to a top surface of a display element responsible for generating the image, a surface associated with a spacer layer responsible for maintaining a desired distance between the pixels of the display element and the lenticular lenses or structures of the lenticular array layer, a surface associated with a filter glass or layer responsible for protecting the pixels of the display element, and/or a surface associated with a protective sheet responsible for protecting other layers of the display component. In one example, the second layer of lacquer may be applied by spraying the surface of the display component. In other examples, the second layer of lacquer may be applied by dipping, coating, or painting the surface of the display component. For instance, a robotic arm may evenly apply or paint the second layer of lacquer micron by micron across the surface.

At 908, a pattern associated with a lenticular array is embossed into the second layer of lacquer. For example, an imprinted pattern roller may be run over the surface of the second layer of lacquer to emboss the lenticular arrays or structures associated with the lenticular array into the lacquer. In other examples a die, mold, plate, etc. may be pressed down upon the surface to emboss the lenticular arrays or structures associated with the lenticular array into the second layer of lacquer.

At 910, a second layer of OCA is contacted with a display component. The second layer of OCA may be cured or hardened to bond the display components into the display stack. For example, the OCA may be UV-cured on the corners and/or around the perimeter, as discussed above, or the LOCA may be placed near a center and pressed outwards towards a perimeter of the display stack while UV-curing. In some cases, the second layer of OCA may be substantially between 80 and 200 um thick.

At 912, a touch sensing layer is applied to the bottom surface of the coverglass. For example, the touch sensing layer or touch pattern may be formed by depositing traces of ITO onto the bottom surface of the coverglass, printing a conductive ink onto the bottom surface of the coverglass, or adhering a pre-formed metal mesh or wiring to the bottom surface of the coverglass. In some specific examples, the touch sensing layer may be formed by applying ITO to the coverglass using physical vapor deposition, electron beam evaporation, or sputter deposition techniques among others.

At 914, a bottom surface of the coverglass is contacted with the first layer of OCA. The OCA may be cured or hardened to bond the coverglass with the lightguide. For example, the OCA may be UV-cured on the corners and/or around the perimeter, as discussed above, or a LOCA may be placed near a center and pressed outwards towards a perimeter of the display stack while UV-curing. In some particular examples, the first layer of OCA may be a film about 100 um thick. In the present example, the OCA film may be applied in a vacuum under a pressure of 50 Pa or less for 20 to 30 seconds.

At 916, a bottom surface of the lightguide is contacted with the second layer of OCA. The second layer of OCA may be cured or hardened to bond the display component with the lightguide. For example, the OCA may be UV-cured on the corners and/or around the perimeter, as discussed above, or a LOCA may be placed near a center and pressed outwards towards a perimeter of the display stack while UV-curing.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising;
  a display stack to display three dimensional images, the display stack including:
    a coverglass positioned as a top layer of the display stack;
    a display component positioned below the coverglass, the display component including:
      a substrate; and
      an active matrix display positioned above the substrate, the active matrix display having a plurality of pixels;
    a touch component positioned above the display component including:
      a first touch sensing layer and a second touch layer, the first touch sensing layer comprising first conductive traces aligned in a first direction, and the second touch sensing layer comprising second conductive traces aligned in a second direction;
      a lacquer layer positioned in between the first touch sensing layer and the second touch sensing layer, the lacquer layer having a plurality of lenticular lenses, wherein a lenticular lens, from the plurality of lenticular lenses, is aligned with a pixel of the plurality of pixels; and
      a spacer layer positioned between the lacquer layer and the display component, the spacer layer having a thickness; and
    a lightguide positioned below the display component.

2. The electronic device as recited in claim 1, wherein the display component further comprises a filter layer positioned between the active matrix display and the spacer layer, the filter layer to tune a color of the three dimensional images displayed by the display stack.

3. The electronic device as recited in claim 1, wherein the display component further comprises a protective sheet positioned above the active matrix display, the protective sheet having a refractive index between 1.3 and 1.6 and a luminous transmittance rating of 90% or greater above 400 nanometer wavelengths and 5% or less below 300 nanometer wavelength.

4. A display component comprising:
a substrate;
a display element positioned above the substrate, the display element having a plurality of pixels; and
a touch component positioned above the display element including:
  a first touch sensing layer and a second touch layer, the first touch sensing layer comprising first conductive traces aligned in a first direction, and the second touch sensing layer comprising second conductive traces aligned in a second direction;
  a lenticular array layer positioned in between the first touch sensing layer and the second touch sensing layer, the lenticular layer having a plurality of lenticular structures, wherein a lenticular structure of the plurality of lenticular structures is aligned with a pixel of the plurality of pixels.

5. The display component as recited in claim 4, further comprising a spacer layer positioned between the lenticular array layer and the display element, the spacer layer formed from an optically clear material and having a thickness, the thickness based at least in part on a desired distance between the plurality of lenticular structures and the plurality of pixels.

6. The display component as recited in claim 4, wherein the lenticular array is formed by embossing and curing a layer of lacquer.

7. The display component as recited in claim 4, wherein the lenticular structure is aligned with the pixel such that a lateral offset between a center of the lenticular structure and a center of the pixel is less than 5 microns.

8. The display component as recited in claim 4, wherein the plurality of lenticular structures are elliptical.

9. The display component as recited in claim 4, wherein the display element includes one or more markings to aid in aligning the plurality of lenticular structures with the pixels of the display element during assembly.

10. A method comprising:
applying a layer of lacquer to a surface of a first touch sensing layer;
imprinting an array of lenticular structures into the layer of lacquer;
curing the layer of lacquer to form the array of lenticular structures; and
combining the first touch sensing layer, the layer of lacquer, and a second touch sensing layer to form at least a portion of a display stack, wherein the layer of lacquer is positioned in between the first touch sensing layer and the second touch sensing layer in the display stack.

11. The method as recited in claim 10, further comprising contacting a bottom surface of a spacer layer to a top surface of a display element of the display stack.

12. The method as recited in claim 10, further comprising:
providing a protective sheet having a bottom surface; and
contacting the bottom surface of the protective sheet to a top surface of the array of lenticular structures.

13. The method as recited in claim 10, wherein the imprinting of the array of lenticular structures includes embossing the layer of lacquer using an embossing wheel and a second plate.

14. The method as recited in claim 10, wherein the imprinting of the array of lenticular structures includes applying a solvent to the layer of lacquer in a pattern associated with the array of lenticular structures.

15. The method as recited in claim 10, wherein the layer of lacquer is liquid.

16. The method as recited in claim 10, further comprising exposing the layer of lacquer to radiation produced by a first Fusion lamp to cure the array of lenticular structures.

17. The method as recited in claim 16, further comprising exposing the array of lenticular structures to radiation produced by a second Fusion lamp after imprinting the array of lenticular structures.

18. The method as recited in claim 10, further comprising aligning an embossing plate with a display element of the display stack prior to imprinting the array of lenticular structures into the layer of lacquer.

19. The method as recited in claim 10, further comprising optically aligning an embossing plate with a display element of the display stack based in part on a location of one or more marks on the display element prior to imprinting the array of lenticular structures into the layer of lacquer.

20. The method as recited in claim 10, further comprising optically aligning an embossing plate with a display element of the display stack based in part on a location of one or more pixels of the display element prior to imprinting the array of lenticular structures into the layer of lacquer.

21. The method as recited in claim 10, wherein the layer of lacquer is between about 2 microns and about 200 microns thick.

22. The method as recited in claim 10, wherein a lenticular structure of the array of lenticular structures is aligned with a pixel of a display element of the display stack such that a lateral offset between a center of the lenticular structure and a center of the pixel is less than 5 microns.

23. The method as recited in claim 10, further comprising:
forming a first optically clear adhesive layer over a top surface of a display element of the display stack;
providing a lightguide having a top surface and an opposing bottom surface;
forming a second optically clear adhesive layer over the top surface of the lightguide;
providing a cover glass having a bottom surface;
applying a touch sensing layer to the bottom surface of the cover glass, the touch sensing layer comprising at least one of the first touch sensing layer or the second touch sensing layer;
contacting a bottom surface of a touch sensing layer to the second optically clear adhesive; and
contacting the bottom surface of the lightguide to the first optically clear adhesive layer.

* * * * *